John Bradbury

Assignor to the Hart Mfg. Co.

TONGS.

No. 120,566. Patented Nov. 7, 1871.

Witnesses.
Nettie Shepard
C. A. Shepard

Inventor.
John Bradbury.
By James Shepard Atty.

UNITED STATES PATENT OFFICE.

JOHN BRADBURY, OF BERLIN, ASSIGNOR TO HART MANUFACTURING COMPANY, OF KENSINGTON, CONNECTICUT.

IMPROVEMENT IN FIRE-TONGS.

Specification forming part of Letters Patent No. 120,566, dated November 7, 1871.

*To all whom it may concern:*

Be it known that I, JOHN BRADBURY, of Berlin, in the county of Hartford and State of Connecticut, have invented certain new and useful Improvements in Tongs, of which the following is a specification:

My invention consists of the peculiar construction and combination of the parts, as hereinafter described.

Figure 1:
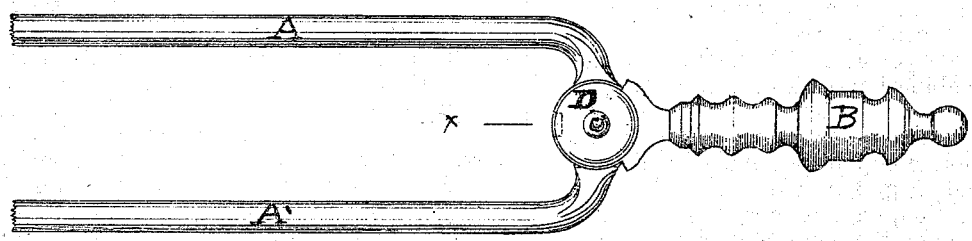
Figure 2:
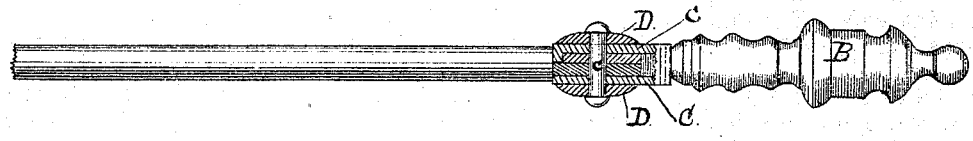
Figure 3:
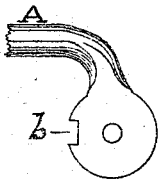

In the accompanying drawing, Figure 1 is a side elevation of a pair of tongs embodying my improvement; Fig. 2, an edge view of the same, partly in section, on line $x\ x$, Fig. 1; Fig. 3, a side elevation of the joint end of the fast leg; and Fig. 4, a side view of the brass joint and loose leg of an ordinary tongs.

The fast leg A, loose leg A', and handle B are, with the exception of the joint end of legs A A', substantially the same as in the ordinary tongs. On the end of the handle B is a hollow head, C, in which the legs A A' are secured. The interior distance from side to side of the head C is equal to the combined thickness of the legs A A' at their joint end. (See Fig. 2.) The joint end of the legs A A' consists of a flat disk, formed on and a part of the leg, as shown in Fig. 3. On one side of the head C is a stud, $a$, which extends toward the opposite side of the head for a distance equal to about one-half of the thickness of the space inside the hollow head. The fast leg A is provided with a recess, $b$, corresponding in position, shape, and size to the stud $a$ on the head C. The position of the stud $a$ and recess $b$ is indicated by broken lines in Fig. 1.

The parts are all of them polished or finished in any desired manner, after which the joint end of the fast leg A is placed in the head C by passing it under the stud $a$ until said stud is brought directly opposite the recess $b$, and enters the same as the leg is brought toward that side of the head C from which the stud $a$ projects. The joint end of the loose leg A' is then inserted, which fills the remaining space between the sides of the head C. The usual caps D D are then placed one on each side of the head C, when the pin $c$ is inserted through the whole and secured by riveting. The fast leg A is thus firmly and immovably held in place while the loose leg is allowed free play.

Figure 4:
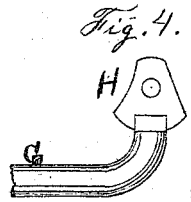

In the ordinary brass tongs the handle is first turned and polished or burnished, the head attached to said handle being provided with a hollow or mortise open on one side of the head to admit the brass joint H of the loose leg G, (see Fig. 4,) and with a smaller opening on the other side. The legs are formed from a round rod with a flat tenon on the upper end, the said tenon being no wider than the diameter of the rod forming the legs. The tenon of the fast leg is then secured in the smaller opening of the head by brazing or soldering, which necessarily requires the parts to be brought to a high heat, thus marring the polished surface of the same, so that a large amount of hand labor is required to clean them, as the leg prevents the handle from being replaced in a lathe. The tenon end of the loose leg G, Fig. 4, is soldered or brazed to a brass joint, H, which joint is a flat piece of a thickness that will fill the mortise in the head, and of a size and shape that will allow it to freely oscillate in the remaining opening of the mortise or hollow head, the brass joint, when the parts are finished, being secured in the head by a pin or rivet.

By my invention both the soldering of the several parts and the hand labor of cleaning are dispensed with, thus producing the article at a less cost, and with the original polished surface on each part, which surface has a decidedly better appearance than the surface cleaned by hand. The article is also believed to be more substantial and durable than the ordinary tongs, as the joint, although cheaper, is much firmer and more easily fitted. The pin passes through both legs and the flat disk of the joint end of the legs is the full size of the head, thus having a much greater bearing-surface than the brass joint of ordinary tongs, and is, therefore, less liable to annoy the user of the article by having the jams or pans of the tongs proper pass each other.

I claim as my invention—

The improvement in tongs herein shown and described, to wit: The combination of the handle B, head C, stud $a$, recess $b$, legs A A', and rivet $c$, all as and for the purpose set forth.

JOHN BRADBURY.

Witnesses:
LEVI B. GLADDING,
CHARLES H. GLADDING.